Feb. 2, 1943.  E. J. RUTHMAN  2,309,670
MOTOR HOUSING
Filed July 15, 1940  2 Sheets-Sheet 1
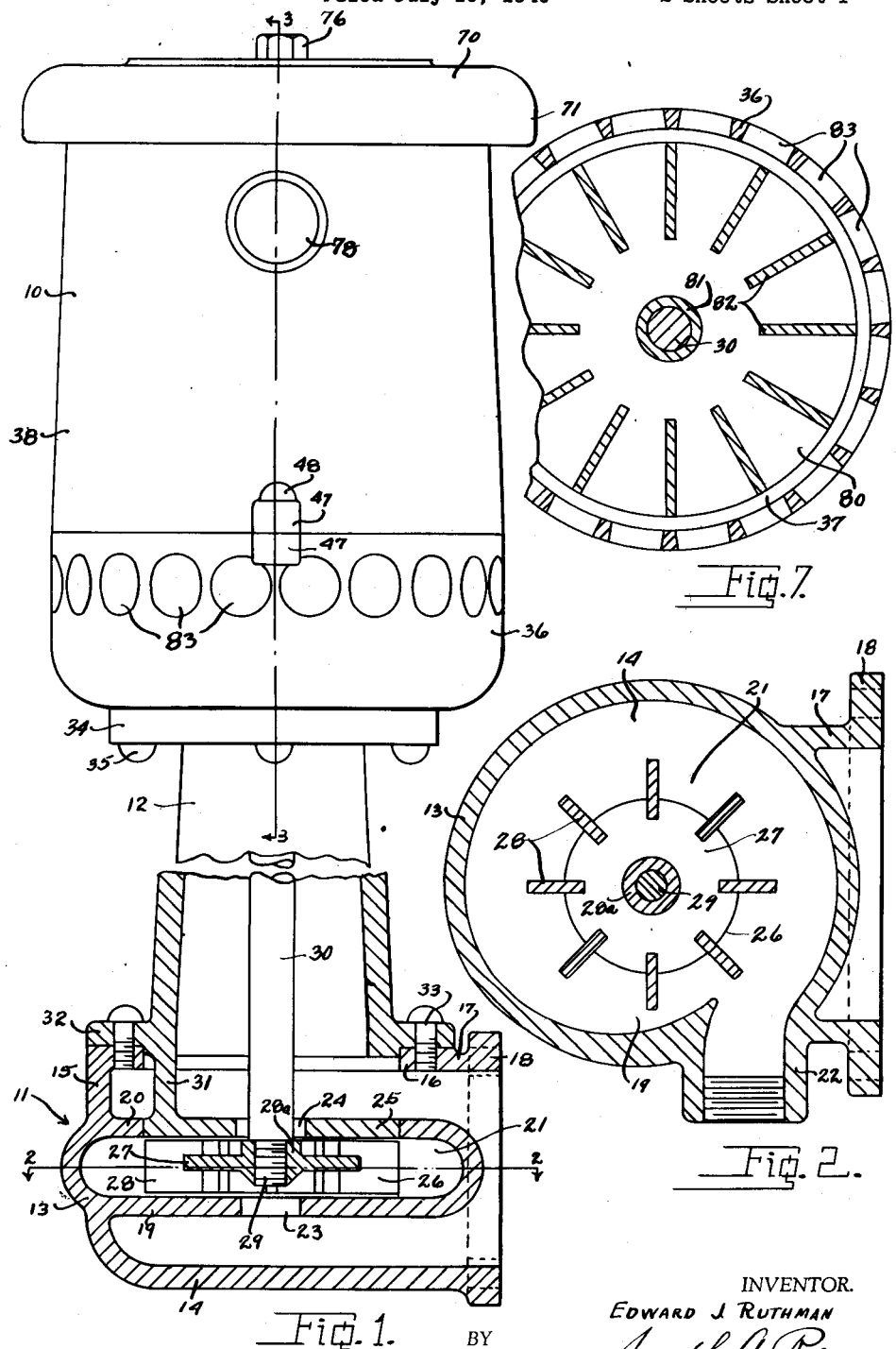
INVENTOR.
EDWARD J. RUTHMAN
BY Joseph A. Rave
ATTORNEY.

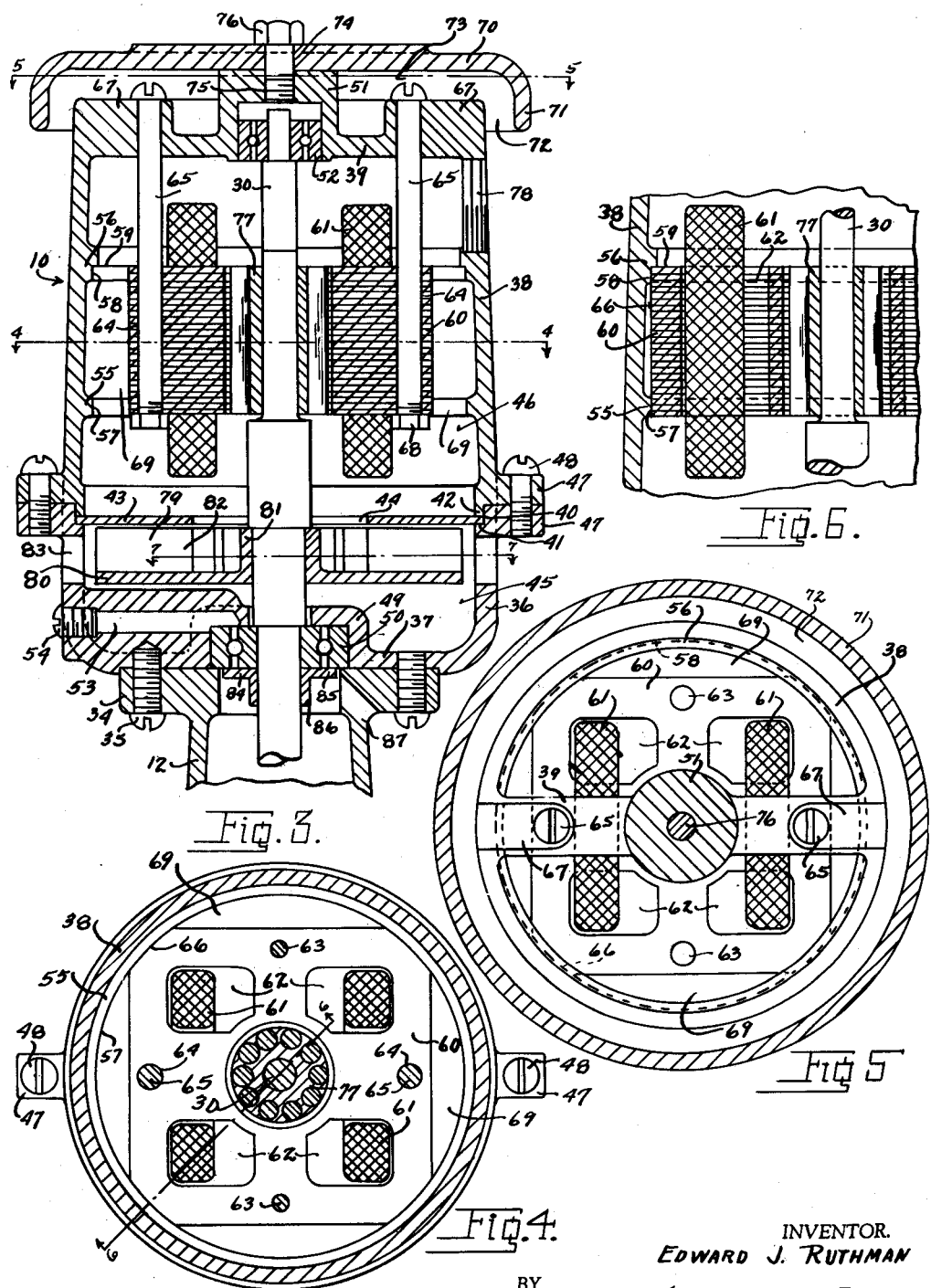

Patented Feb. 2, 1943

2,309,670

UNITED STATES PATENT OFFICE 2,309,670

MOTOR HOUSING

Edward J. Ruthman, Cincinnati, Ohio

Application July 15, 1940, Serial No. 345,471

8 Claims. (Cl. 172—36)

This invention relates to improvements in a motor housing and particularly to a motor housing for an inexpensive, low powered electric motor, such as may be employed for a low capacity circulating pump.

It has become the practice to employ low volume, inexpensive pumps for circulating coolant, cutting compounds and similar fluids on machine tools and which pumps are relatively inexpensive. With such pumps it is customary to employ relatively low powered, high speed electric motors as the driving or motivating force. This type of electric motor has the tendency to rapidly heat, when it is used continuously, which reduces its operative life to a relatively short one, unless efficiently and effectively cooled. At the same time it is necessary to reduce the cost of cooling the motor as well as housing it to a minimum.

It is, therefore, the chief object of this invention to provide a housing for a low powered, high speed electric motor which will enable the motor to be maintained at a cool stage during operation.

Another object of this invention is the provision of a housing for an electric motor, as above specified, which can be readily assembled to include the motor parts in a minimum of time and at a minimum of expense.

It is also an object of this invention to provide an electric motor housing compoosed of a minimum number of parts and in which the parts are readily assembled to enclose the motor parts and which can be readily disassembled for inspection and repair or replacement of the motor parts.

A still further object of this invention is the provision of a motor housing having a minimum of parts, which require merely the securing together of said parts for fastening the motor in position and including means for effectively and efficiently cooling the said motor.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 1 is an elevational view, part'y in section, of a circulating pump including the improved motor housing of this invention.

Fig. 2 is a horizontal sectional view through the pump proper taken on line 2—2 on Fig. 1.

Fig. 3 is a fragmentary vertical sectional view through the motor and its housing taken on line 3—3 on Fig. 1.

Fig. 4 is a horizontal sectional view through the motor and housing taken on line 4—4 on Fig. 3.

Fig. 5 is a horizontal sectional view through the motor housing just below the dust cap taken on line 5—5 on Fig. 3.

Fig. 6 is a fragmentary vertical sectional view through a portion of the motor housing taken on line 6—6 on Fig. 4.

Fig. 7 is a fragmentary horizontal sectional view through the cooling fan associated with the motor taken on line 7—7 on Fig. 3.

Throughout the several views of the drawings similar reference characters are employed to denote the same or similar parts.

As was noted above this invention pertains primarily to an electric motor housing, particularly to a housing for a low powered high speed motor, such as would be used with a circulating pump for circulating liquids, fluids and the like. The invention is illustrated in the drawings as employed on a circulating pump, self-contained, with its motor mounted thereabove.

As shown the self-contained motor-pump comprises, in general, an electric motor 10 and a pump 11 connected with one another by a connecting housing 12. The pump 11 comprises a housing 13 having a bottom 14, upstanding sides 15, which form in effect a cylinder, and a top 16. Projecting from the pump housing side 15 is, substantially, a sleeve 17 which terminates in a flange 18 adapted to be employed for mounting the pump on the side of a liquid or fluid containing tank (not shown). The pump housing 13 between its top 16 and bottom 14 is provided interiorly with flanges 19 and 20 which are spaced from one another to form a pressure chamber 21. The flanges 19 and 20 after making a substantial circle within the housing are joined to provide a discharge pipe 22 which extends substantially tangentially of the pressure chamber. The discharge pipe 22 crosses the supply passage or port, within the sleeve 17, to provide supply ports above and below the flanges 20 and 19. The supply port below the flange 19 supplies the pressure chamber through an eye or opening 23 in the flange 19 while the supply port above the flange 20 supplies said pressure chamber 21 through an eye or opening 24 through the flange 25 which is in effect a disc located in alignment with the housing flange 20.

Disposed within the pressure chamber 21 is an impeller 26 comprising a radial flange 27 having integral therewith pump vanes 28. The disc 27 is provided, centrally thereof, with hub 28a having a tapped aperture receiving the threaded reduced end 29 of a motor-pump shaft 30. The shaft 30 passes from the pressure chamber 21 through the opening or eye 24 and extends centrally of the hollow connecting housing 12.

The disc or pressure chamber flange 25 is connected with the housing 12 by one or more arms 31 which position said flange or disc 25 at the propjer distance below the pump housing top 16 to align same with the housing flange 20. In order to secure the connecting housing 12 to the pump housing 13 said connecting housing 12 has a radial flange 32 adapted to be disposed on the pump housing top 16. The flange 32 is provided with a series of plane apertures in alignment with tapped apertures in the pump housing top 16 for the reception of suitable screws or bolts 33.

The upper end of the connecting housing 12 is similarly connected to the motor 10 and for which purpose the said connecting housing 12 is provided at its upper end with a radial flange 34 through which passes screws or bolts 35 into the motor housing.

The motor housing comprises two parts, a lower housing member 36, in the form of a hollow cap or shell having an open upper end and a closed lower end or bottom 37, and an upper housing member 38, cylindrical in shape and slightly conical with its lower end open and its upper end provided with a cross bar 39, see Fig. 5. The lower housing member 36 is provided in its upper end with a counterbore 40 providing a seat 41 while the upper housing member 38 is provided at its open lower end with a reduced projecting sleeve 42 disposed in the counterbore 40. Resting on the counterbore seat 41, and held thereto by the sleeve 42, is a disc 43 having an enlarged center aperture 44. The disc 43, in effect, divides the interior of the motor housing 36—38 into two chambers 45 and 46. In order to secure the housing members with the partition disc in operative position, the said housing members 36—38 are each provided at diametrically opposite points with an ear 47 contacting one another. The ears of the upper housing member 38, for example, may be provided with plane apertures while the opposed ears 47 of the lower housing member 36 are provided with tapped apertures to receive the threaded ends of screws or bolts 48 which pass through the plane apertures of the upper housing ears 47.

Projecting interiorly of the lower housing member 36 is a boss 49 counterbore to receive an anti-friction or ball bearing 50. The cross bar 39, at the upper end of the upper housing member 38, is also provided with a boss 51 counterbored to receive an anti-friction or ball bearing 52 which is in alignment with the ball bearing 50 and together provide the running bearings for the motor-pump shaft 30. Suitable means may be provided for supplying lubricant to these bearings, for example, lubricant or oiling port 53 may be provided from the boss 49 to the exterior of the housing 36 and this port 53 suitably provided with an "oiling fixture" 54.

Intermediate the ends of the motor housing 38 and interiorly thereof are ribs 55 and 56 the former having a plane bore 57 therethrough while the latter is provided with a counterbore 58 to provide a seat 59. Extending between the ribs 55 and 56 are the motor field lamination 60 which together with the field coils 61 constitute the stater for the motor.

As seen in Figs. 4 and 5 the lamination 60 are substantially square in area having the usual punching 62 to provide space for the field coils 61 and at the same time provide the magnetic poles. The lamination 60 are secured to one another the means of a pair of rivets 63 located at diametricaly opposite points. The field lamination 60 at diametricaly opposite points, located approximately mid-way between the rivets 63, are provided with apertures 64 for the passage therethrough of bolts 65.

The field lamination 60 have their corners removed to a diameter substantially equal to the diameter of the bore 57 and counterbore 58 as shown at 66 in Fig. 4. The bolts 65 extend through apertures formed through bosses 67 provided by the housing cross bar 39 and which apertures are in alignment with the laminations apertures 64. Nuts 68 on the lower ends of the bolts 65 engage the lower surface of the laminations 60 for urging said laminations vertically of the housing against the counterbore seat 59 and thereby securely fasten the laminations 60 against the said counterbore seat 59. By this construction considerable air spaces 69 are provided between the sides of the laminations 60 and the inner wall of the motor housing member 38 and which spaces are used for the circulation of air, as will be subsequently described.

The cross bar 39 of the upper housing member provides a substantially open top for the motor housing and this space is covered by a dirt or dust cap 70. As seen in Fig. 3 the cap 70 is of some what greater area than the top of the motor housing 38 and is dish shape to provide a down turned flange 71 which extends below the top of the housing 38 and at the same time provides an air passage way 72 between the flange 71 and the outer surface of the housing 38. This passage way is continued across the top of the housing 38 as at 73 and is provided by extending upwardly the bearing boss 51 and on which rests the dust cap 70. In order to secure the dust cap 70 in position it is provided centrally thereof with an aperture 74 which is in alignment with a tapped aperture 75 in the bearing boss 51. Extending through the aperture 74 and threaded into the aperture 75 is a cap screw 76 for clamping the dust cap 70 between its head and the top surface of the boss 51.

Pressed on or otherwise secured to the motor-pump shaft 30 centrally of the field lamination 60 is the motor rotor 77 which may be of any desirable construction. In order to connect the motor field with a source of current the housing 38 is provided with the usual opening 78 conveniently threaded to receive the conduit for the feed wires.

Located within the chamber 45 in the lower motor housing 36, and pressed on or otherwise secured to the shaft 30, is a fan 79 comprising a disc 80 extending from a hub 81 and said disc having a plurality of fan blades 82. The wall of the housing 36 is provided with a series of apertures 83 which are around the periphery of the fan 80.

The operation of the mechanism is as follows:
It is believed that the operation of the pump, per se, is obvious, since the rotation of the shaft 30, by the motor, rotates the impeller 26 in a clockwise direction, as seen in Fig 2, and will discharge the liquid and fluid, to be circulated, through the discharge pipe 32.

The rotation of the shaft 30 simultaneously rotates the fan 80, secured thereto, and located in the chamber 45. The fan 80 is of the suction type and therefore draws the air within the motor chamber 46 down to it. The flow of air is, therefore, from the outside of the motor through the air passages 72 and 73 formed around the upper end of the motor housing 38 by the opposed walls of said housing and the dust cap 70 and its flange 71. The air moves through the top of the housing 38 on each side of its cross bar 39 and then passes down through the air spaces 69 located on each side of the motor field laminations 60. The air after passing through the spaces 69 impinges against the partition disc 43 and passes there along to the opening 44 at the center of the partition disc 43 to the fan 80. The fan 80 of course discharges the air through the apertures 83 to the atmosphere at a point below the motor.

From the foregoing it will be noted that the outside or cooler air is drawn through the motor to pick up the heat, generated in the rotation of the motor, as it passes along the field laminations 60 and discharges this heated air back to the atmosphere. It has been found that this construction maintains the temperature of the motor at a safe point while to operate this motor without cooling, it will be burnt up in a very short time. It was also found that to attempt to reverse the flow of air through the motor, namely, draw air in from the atmosphere through the apertures 83 and force the air past the motor and out to the atmosphere by way of passages 73 and 72, had very little cooling effect on the motor and the motor life was substantially no greater than that of a motor devoid of any air cooling system of any kind.

It will be noted that the motor may be assembled within its housing with the expenditure of a minimum of time and that the parts are so designed that the motor may be very readily taken apart and assembled without the use of skilled labor or expensive tools. For example only two bolts 65 are employed for securing the field lamination in position; one bolt 76 is employed for fastening the dust cap 70 to the upper housing 38; only two screws or bolts 48 are employed for securing the upper and lower motor housing members 38 and 36 to one another; and the partition disc is automatically secured in position upon the fastening together of said upper and lower motor housing members.

It is believed, from the foregoing, it will be evident, that the motor housing is a very inexpensive unit and can be readily assembled with a minimum expenditure of time and labor in the assembly as well as in the machining or fabrication of the parts.

As in all centrifugal pumps of the class here disclosed and described spray or mist has a tendency to rise within the connecting housing 12 which must be intercepted to prevent it saturating the motor parts. Accordingly the motor-pump shaft 30 has pressed or otherwise secured to it, at a point just below the bearing 50, an intercepter 84 which comprises a disc 85 having a hub 86 which encircles the shaft 30. Rotation of the intercepter 84 with the shaft 30 intercepts the said mist and spray and centrifugally discharges same to the atmosphere through one or more openings 87 located at the upper end of the connecting housing 12 and in alignment with the centrifugal discharge of the intercepter 84.

What is claimed is:

1. In an electric motor of the class described a substantially cylindrical housing member open at its top and bottom, a radial flange interiorly of the housing member intermediate its top and bottom for providing a seat, a motor field within the housing member on said seat, and means carried by the housing member for securing the motor field to the seat, comprising a cross bar across the open upper end of the housing member, and bolts extending through and depending from said cross bar and passing through the motor field, and nuts on said bolts for rigidly securing said motor field in the seat.

2. In an electric motor of the class described a substantially cylindrical housing member open at its top and bottom, a radial flange interiorly of the housing member intermediate its top and bottom for providing a seat, a motor field within the housing member on said seat, means carried by the housing member for securing the motor field to the seat, comprising a cross bar across the open upper end of the housing member, bolts extending through and depending from said cross bar and passing through the motor field, nuts on said bolts for rigidly securing said motor field to the seat and means carried by the cross bar but spaced from the end of the cylindrical housing member for covering said end of the housing member and simultaneously providing an air passage way to the interior of the cylindrical housing.

3. In an electric motor of the class described a substantially cylindrical housing member open at its top and bottom, a radial flange interiorly of the housing member intermediate its top and bottom for providing a seat, a motor field within the housing member on said seat, means carried by the housing member for securing the motor field to the seat, comprising a cross bar across the open upper end of the housing member, bolts extending through and depending from said cross bar and passing through the motor field, nuts on said bolts for rigidly securing said motor field to the seat, means carried by the cross bar but spaced from the end of the cylindrical housing member for covering said end of the housing member and simultaneously providing an air passageway to the interior of the cylindrical housing, and a fan below the lower open end of the motor housing for drawing air therethrough.

4. In an electric motor of the class described a substantially cylindrical housing member open at its top and bottom and having a reduced portion at its lower end, a radial flange interiorly of the housing member intermediate its top and bottom for providing a seat, a motor field within the housing member on said seat, means carried by the housing member for securing the motor field to the seat, said motor field having air spaces at the sides thereof between itself and the motor housing, a second housing member for closing the bottom of the cylindrical housing member and having a counterbore on its upper end, a partition having a central opening in said counterbore and held to its seat by the reduced portion of the housing member between said housing members, a fan below said partition for drawing air through the air spaces at the sides of the motor field to cool said motor field, and means carried by the other end of the cylindrical motor housing for covering same but providing an air passageway therebeneath through which the cool air is drawn by the fan.

5. In an electric motor of the class described a substantially cylindrical housing member, a cross bar across one end of the housing member providing an opening on each side thereof to the interior of the housing, motor field laminations having an area less than the area of the housing and bounded by angularly disposed straight edges with circular edges formed to a diameter between the angularly disposed straight edges, whereby an air space is provided between the said straight edges of the laminations and the interior of the housing, a peripheral seat inwardly of the housing, securing bolts depending from the cross bar through the field laminations and receiving nuts for drawing the laminations securely against the housing seat, and a rib interiorly of the housing and have a bore therein equal to the diameter of the circular edges of the laminations and which rib engages the lower ends of the laminations for alignment purposes.

6. In an electric motor of the class described a substantially cylindrical housing member, a cross bar across one end of the housing member providing an opening on each side thereof to the interior of the housing, motor field laminations having an area less than the area of the housing and bounded by angularly disposed straight edges with circular edges formed to a diameter between the angularly disposed straight edges, whereby an air space is provided between the said straight edges of the laminations and the interior of the housing, a peripheral seat inwardly of the housing, securing bolts depending from the cross bar through the field laminations and receiving nuts for drawing the laminations securely against the housing seat, said cross bar having a central upwardly projecting boss, and a dish shaped dust cap centrally secured to said boss whereby the depending flange of the dust cap is spaced from the housing to provide an air passage therebeneath to the openings on each side of the cross bar and to the interior of the housing.

7. In an electric motor of the class described a substantially cylindrical housing member, a cross bar across one end of the housing member providing an opening on each side thereof to the interior of the housing, motor field laminations having an area less than the area of the housing and bounded by angularly disposed straight edges with circular edges formed to a diameter between the angularly disposed straight edges, whereby an air space is provided between the said straight edges of the laminations and the interior of the housing, a peripheral seat inwardly of the housing, securing bolts depending from the cross bar through the field laminations and receiving nuts for drawing the laminations securely against the housing seat, said housing having its lower end open and provided with a reduced projecting sleeve, a closing housing for said open end and having a counterbore receiving the reduced projecting sleeve, means for securing said housings to one another, and bearings provided by the housing cross bar and the lower housing for supporting a shaft centrally thereof.

8. In an electric motor of the class described a substantially cylindrical housing member, a cross bar across one end of the housing member providing an opening on each side thereof to the interior of the housing, motor field laminations having an area less than the area of the housing and bounded by angularly disposed straight edges with circular edges formed to a diameter between the angularly disposed straight edges, whereby an air space is provided between the said straight edges of the laminations and the interior of the housing, a peripheral seat inwardly of the housing, securing bolts depending from the cross bar through the field laminations and receiving nuts for drawing the laminations securely against the housing seat, said cross bar having a central upwardly projecting boss, a dish shaped dust cap centrally secured to said boss whereby the depending flange of the dust cap is spaced from the housing to provide an air passage therebeneath to the openings on each side of the cross bar and to the interior of the housing, said cylindrical housing having a projecting sleeve, a lower housing having a counterbore therein, a partition disc within said lower housing counterbore and disposed on the counterbore seat and which projecting sleeve acts as means for securing the partition disc in position, and a fan below said partition disc for causing a circulation through the motor housing.

EDWARD J. RUTHMAN.